Patented May 25, 1943

2,319,792

UNITED STATES PATENT OFFICE 2,319,792

ABRASIVE

Loring Coes, Jr., Brookfield, Mass., assignor to Norton Company, Worcester, Mass., a corporation of Massachusetts No Drawing. Application July 23, 1942, Serial No. 452,090

9 Claims. (Cl. 51—298)

The invention relates to grinding wheels and other solid abrasive compositions. With regard to its more specific features, the invention relates to grinding wheels or other solid abrasive articles bonded with organic bond, especially the polymerized condensation product of a primary aromatic amine with an aldehyde.

One object of the invention is to provide a superior plasticizer for abrasive grains for the manufacture of the foregoing type of abrasive composition. Another object of the invention is to provide an improved dry snagging wheel. Another object of the invention is to provide a grinding wheel or other solid abrasive article which, in various embodiments, may be substituted for abrasive articles bonded with shellac, rubber or phenol-formaldehyde, and which will remove a greater amount of metal for a given wheel wear.

Another object of the invention is to provide an ingredient for assisting the conversion of an aromatic amine-aldehyde resin, particularly aniline-formaldehyde, to the infusible condition. Another object of the invention is to provide a mixing plasticizer for abrasive grains having properties superior to furfural for the manufacture of the type of abrasive articles indicated. Another object of the invention is to provide a mixing plasticizer which does not react to form water.

Another object of the invention is to provide a wetting agent for carrying out the dry granular mix method in the manufacture of the type of abrasive articles indicated of superior quality. Another object is to avoid or prevent swelling of the abrasive article; to permit cold pressing and curing without pressure, and to avoid the formation of any water during the cure. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of a primary aromatic amine, such as aniline, ortho, meta or para toluidine, or diamino diphenyl methane; and a quantity of formaldehyde. I may optionally provide a quantity of one or more organic compounds containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. Aniline

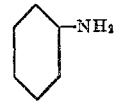

or one of the other aromatic amines mentioned, or mixtures of two or more of such amines, is reacted with formaldehyde HCHO in the presence of a strong acid to produce a long chain polymer which, when an excess of formaldehyde above the stoichiometric proportions is used, for example, 20% excess, has adjacent chains connected with methylene —$CH_2$— groups to form a tough, heat resistant, semi-thermoplastic resin. I may add some of the formaldehyde after the initial condensation, in the form of paraformaldehyde, or by the addition of hexa-methylene-tetramine.

As examples of the halogenated organic compound, I may use any of polyvinyl chloride, polyvinylidene dichloride, rubber hydrochloride, chlorinated rubber, chlorinated polyisobutylene; any chlorine, bromine or iodine substituted paraffine hydrocarbon, such as hexa chlor ethane, tetra chlor pentane, 1, 2, diiodo ethane, beta butylene bromide, partly chlorinated eicosane, or any aliphatic halohydrin of not more than six carbon atoms, such as any of the amylene chlorhydrins; propylene chlorhydrin; any of the butylene chlorhydrins; ethylene chlorhydrin, ethylene bromhydrin, or glycerol alpha gamma dichlorhydrin. Naturally enough, most of the examples are chlorinated compounds because these are cheaper and more readily available than the brominated or iodated compounds, but the latter two give effective results. The fluorinated compounds are rejected because they are too stable and will not alkylate the polymer. However, so far as the broad features of this invention are concerned, and apart from the esters hereinafter described, the halogenated organic compound may be omitted altogether.

Since the invention relates to grinding wheels and other solid abrasive compositions and articles, I provide a quantity of abrasive grain. Any abrasive grain may be used, for example, any of the varieties of alumina, such as emery, corundum, dense "regular" fused alumina, porous white fused alumina; silicon carbide and other hard carbides; quartz; glass; garnet; or diamonds. Two or more of these abrasives may be mixed, if desired.

Manufacturers usually prefer to use the dry granular mix method, with the cold press and the oven to make organic bonded grinding wheels because this combination of steps and features is the cheapest to carry out and, furthermore, generally gives uniform results. In the dry granular mix method the abrasive grains are placed in a mixing pan and are then wet with a suitable liquid; then powdered fusible resin is added, mixing is done to coat each granule with some of the powder and to leave a minimum of loose powder, then a mold is charged with the "dry granular mix" thus produced, the top plate is inserted, the mold is "closed" by means of an hydraulic press, the mold is then "stripped," the "green" wheel is taken to an oven and (at the same time as hundreds or thousands of others of varying sizes, shapes and compositions) it is cured to make the final composition and, after "truing" or "shaving," the final article. This method, in contradistinction to the use of the hot press with or without the autoclave and vice versa, has the advantage that ordinary ovens, in which thousands of "green" wheels can be stacked, are used; the hydraulic press it tied up by a given wheel for thirty seconds instead of thirty minutes, and the press need have no heated platens. This wetting of the abrasive grains by a liquid is called "plasticizing." It is preferred that the wettant be a solvent for the resin.

In the commercial manufacture of aniline-formaldehyde resin bonded grinding wheels and other solid abrasive products, only furfural has been used as this plasticizer-wettant. (Other aromatic-amine-aldehyde polymers have not been used commercially for the manufacture of grinding wheels and other solid abrasive products so far as I am aware.) The furfural cross links the polymer and, therefore, converts it to the "infusible" condition. A stoichiometric quantity of aniline and formaldehyde condensed in the presence of a strong acid is believed to produce a resin which is structurally represented thus:

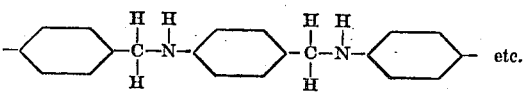

Such a resin cross linked with furfural is believed to be represented thus:

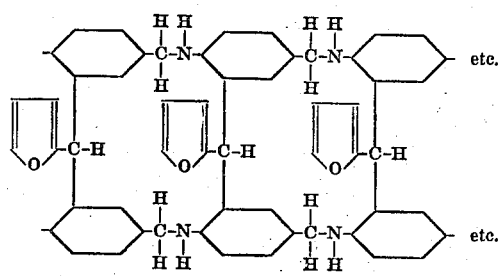

My invention consists in the use of the di-monochloracetate of ethylene glycol, or poly-ethylene glycol, or substituted poly-ethylene glycols, or trimethylene glycol di-monochloracetate as the wettant plasticizer for grinding wheels and other solid abrasive articles made out of abrasive grains bonded with aromatic-amine-aldehyde resin with or without the use of other halogenated compounds, with or without other fillers, and with or without the use of other wettant plasticizers. For example a mixture of di-monochloracetate of ethylene glycol and furfural may be used to wet the abrasive grains, but at present I prefer to use di-monochloracetate of ethylene glycol alone. This ester is:

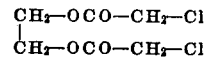

I believe it cross-links with the aniline-formaldehyde polymer thus:

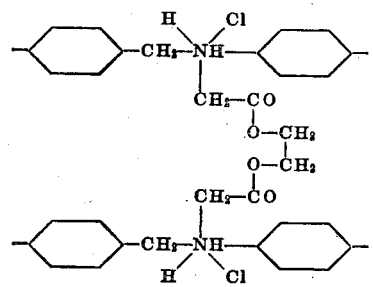

It will be noted that chlorine now appears in the amino group. When a grinding wheel according to the invention is used to grind, the heat generated by grinding (which may reach 500° C. or more and is a higher heat than generated in most sanding operations with sandpaper or the like) releases hydrogen chloride at the grinding line which appears to have a pronounced effect upon the grinding operation, preventing or at least minimizing "loading" and assisting in the cutting action by making the metal chips more brittle.

Di-ethylene glycol di-monochloracetate is written thus:—

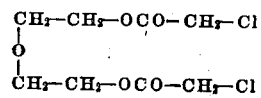

Tri-ethylene glycol di-monochloracetate is written thus:

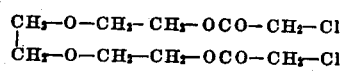

Tri-methylene glycol di-monochloracetate is written thus:

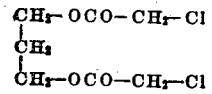

These compounds are all esters and it will be seen that the four compounds are definitely related to each other and they might all be called glycol di-monochloracetates, and my invention consists in the use of any of them in the combination above explained in regard to ethylene glycol di-monochloracetate. However, the compounds of large molecular weight, that is, having additional $C_2H_4O$ groups are solids and are not usable in my invention. Therefore, I use any glycol di-monochloracetate selected from the group consisting of ethylene glycol di-monochloracetate, di-ethylene glycol di-monochloracetate, tri-ethylene glycol di-monochloracetate, and tri-methylene glycol di-monochloracetate.

The above-mentioned relationship between the four compounds appears also from the manner in which they cross-link with the aniline-formaldehyde polymer, one of which cross-linkages is set forth above as to the ethylene glycol di-monochloracetate; the di-ethylene glycol di-monochloracetate cross-links with the above polymer thus:

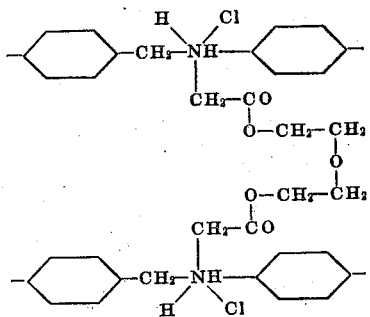

The tri-ethylene glycol di-monochloracetate cross-links with the polymer thus:

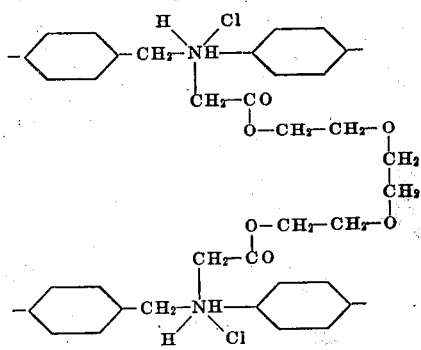

The tri-methylene glycol di-monochloracetate cross-links with the above polymer thus:

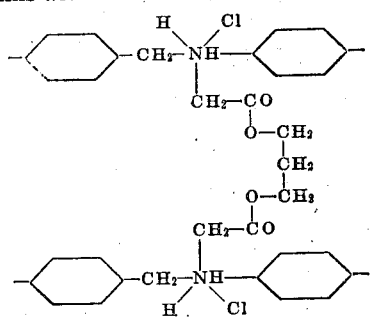

In each case, it will be seen that chlorine appears in the amino group, and a grinding wheel, when made according to my invention, utilizing any of the glycol di-monochloracetates, or mixtures thereof, as wettant plasticizers, can release hydrogen chloride at the grinding line under the influence of the heat there generated. Illustrative examples of grinding wheels are set forth hereinafter.

My invention, however, consists also in the discovery of these compounds and in the discovery that they are capable of effective and efficient coaction as plasticizers and hardening agents for aromatic amine aldehyde resins and that by appropriate admixture of the two, with or without fillers, a good, strong resin of appropriate hardness is produced. The mixture is readily moldable and may be hot pressed for curing and hardening or may be cold pressed and then baked, and in the latter instance it does not tie up, for substantial periods of time, expensive hot press equipment. The examples later herein set forth, give illustrations of both methods of hardening and though they are illustrations of the making of abrasive articles, these examples will suffice to illustrate the aspects of my invention now under consideration, for, for those purposes, the abrasive grains may be treated as fillers, but it will be understood that, in the making of abrasive articles, I am enabled to achieve certain unique coactions some of which, such as the liberation of hydrogen chloride at the grinding line, are above mentioned, and some others of which I mention later hereinafter.

Insofar as I am aware, the above-mentioned plasticizer and hardening agents are per se new compositions of matter and the manner of producing them will appear from the following illustration of a preferred way of making, according to my invention, di-ethylene glycol di-monochloracetate.

Thus, I may start with about 186 grams of chloracetic acid and 106 grams of di-ethylene glycol which I then heat in an open flask at 125° C. for 12 hours. The mixture is then poured into water and neutralized with sodium carbonate. The ester is then washed with water, dried over sodium sulphate and finally heated at 100° C. under a pressure of 20 millimeters for 3 hours to remove volatile impurities.

The di-monochloracetates of ethylene glycol, tri-ethylene glycol, and tri-methylene glycol may be made in the same manner, using the same stoichiometric proportions of reactants.

The esters prepared in this way are nearly colorless liquids, having a slight pleasant odor. When mixed with aniline formaldehyde resin, the latter in powdered form, the mix may be molded at room temperature, then removed from the mold, and cured in an oven; or the mix may be worked into a sheet of desired thickness, as on mixing rolls, the desired shape or conformation cut or stamped from the sheet and then cured in an oven, or the mix may be molded and hot pressed.

Several examples of the making up of abrasive articles will suffice to give concrete illustration of the various features of the various aspects of my invention; thus:

*Example I*

525 grams of #46 grit "Alundum" abrasive grains are wet with 20 cc. of ethylene glycol di-monochloracetate, and here I find that this ester, as is true of the others, is a good wettant for the grain. To this is then added, with stirring, the dry powdered resin with or without other ingredients, to make a dry granular mix and in this example I add 165 grams of a mixture comprising, by volume, 65% of an aniline formaldehyde resin, 30% of cryolite, and 5% of soluble anhydrite. The resultant well stirred or well mixed dry granular mix is spread in a 6" mold (for making a grinding wheel) and is pressed to a pore volume of 15%, the molding and pressing being at room temperature.

The "green" wheel is then stripped from the mold and is cured in an oven; preferably I use an initial curing temperature of 95° C., gradually raising it over a period of 4 hours to 175° C., thereafter keeping the wheel at 175° C. for 2 hours and then cooling it slowly.

The di-monochloracetates of di-ethylene glycol, tri-ethylene glycol, and tri-methylene glycol may be used in the same manner, using substantially the same proportions.

*Example II*

525 grams of #80 grit "Alundum" abrasive grain is wet with 25 cc. of ethylene glycol di-monochloracetate, and to that is added an aniline formaldehyde resin with or without other elements, and, for making a grinding wheel, I add to the above-mentioned wetted grain 165 grams of a mixture comprising, by volume, 65% of an aniline formaldehyde resin, the latter in powdered form, 30% of cryolite, and 5% of soluble anhydrite. The resultant well mixed or stirred "dry granular mix" is then worked on differential mixing rolls until it is formed into a sheet which is then passed through calendar rolls to give it the desired thickness, in this example a thickness of $\frac{3}{32}''$. A 12" disk is then cut from the sheet and the resultant "green" wheel is then cured in an oven in the manner described in Example I above.

The other esters may be used in the same manner, using substantially the same proportions of ingredients as in this Example II.

The esters are good solvents for aniline formaldehyde resin, are good hardening agents therefor, and are good molding plasticizers. When making abrasive articles such as grinding wheels, the esters are good wettants for the abrasive grains and in cross-linking with the polymer as above described, they coact to bring about in the final product, the release of hydrogen chloride at the grinding line, certain of the advantages of which have been pointed out above. In their cutting action, grinding wheels have a resemblance to the cutting action of wheels bonded with hard rubber but I find that the esters make possible some variation in the grinding characteristics according to the work which the particular wheel is to do, and a substantial range of control may be effected.

Thus, for example, in the making of grinding wheels, I have found that the hardness of the wheel decreases in the order of mono-, di-, tri-, ethylene glycol di-monochloracetate and tri-methylene glycol di-monochloracetate, that is, the wheels are softer in the order of the just-named plasticizers employed, while intermediate grades of hardness can be achieved by using mixtures of two or more of the esters. Thus a wide range of grinding wheel characteristics can be achieved.

By way of further example, and generally stated, a wheel made up using tri-ethylene glycol di-monochloracetate may be said to have characteristics that permit it to be employed where a shellac-bonded wheel is suitable but comparative tests show a wheel wear (running wet) of 0.055 and a wheel wear (running dry) of 0.134 for the former as compared to 0.628 and 0.917 (respectively wet and dry) for a shellac-bonded wheel.

In a generally similar way and generally stated, a wheel made up according to my invention and utilizing ethylene glycol di-monochloracetate as the wettant plasticizer and hardening agent may be said to have characteristics that permit it to be used to do the work of a hard-rubber-bonded wheel, but comparative tests show a wheel wear (running wet) of 0.040 and a wheel wear (running dry) of 0.049 for the former as against 0.028 and 0.086 (respectively wet and dry) in the case of a rubber-bonded wheel.

Other tests of wheels made according to my invention show a wheel wear of 0.063 (running wet) and a wheel wear of 0.173 (running dry) for a wheel in which di-ethylene glycol di-monochloracetate is employed, and a wheel wear of 0.106 (running wet) and a wheel wear of 0.063 (running dry) for a wheel utilizing tri-methylene glycol di-monochloracetate.

The wheels embodying my invention and as to which test data are above set forth were all made up according to the proportions of ingredients illustrated in the foregoing Examples I and II, the wheel wear is set forth in square inches per cut including also as to the shellac-bonded and rubber-bonded wheels, and the test data as to all of the wheels was obtained by cutting off $\frac{3}{4}''$ cold rolled steel with the wheels running at 9,500 surface feet per minute.

According to certain prior practices, difficulties are encountered during heat treatment or curing, due to the fact that swelling occurs; such swelling usually results from the formation of water and is aggravated by the conversion of water or possibly also of other constituents into vapors, under the action of the heat treatment. But according to my invention such disadvantages and defects are successfully overcome and I find that, in practicing my invention, no such swelling occurs; this is due to the fact that no water or other liquid or vapors thereof, as would cause swelling, during the heat treatment or curing, are formed.

I make no claim herein to the resinous compositions or method of making the same or to the plasticizer or hardening agent inasmuch as such subject matter is disclosed and claimed in my copending application Serial No. 452,091, filed of even date herewith.

It will thus be seen that there has been provided by this invention, an article, a composition and a method in which the various objects hereinabove set forth together with many thoroughly practical advantages are successfully achieved.

As various possible embodiments might be made of the mechanical features of the above invention and as the art herein described might be varied in various parts, all without departing from the scope of the invention, it is to be understood that all matters hereinabove set forth is to be interpreted as illustrative and not in a limiting sense.

I claim:

1. Method of making abrasive articles comprising wetting a quantity of abrasive grain with a wettant resin-hardener that comprises an agent selected from the group consisting of the mono-, di-, and tri-, glycol di-monochloracetates and tri-methylene glycol di-monochloracetate and a mixture of two or more thereof, stirring into the wet abrasive grain a quantity of amine formaldehyde resin to produce a plastic moldable granular mix, and curing the mix at resin-curing temperature.

2. Method of making abrasive articles comprising wetting a quantity of abrasive grain with a wettant resin-hardener that comprises an agent selected from the group consisting of the mono-, di-, and tri-, glycol di-monochloracetates and tri-methylene glycol di-monochloracetate and a mixture of two or more thereof, stirring into the wet abrasive grain a quantity of amine formaldehyde resin to produce a plastic moldable granular mix, shaping the mix at substantially room temperature, and then curing at curing temperature.

3. Method of making abrasive articles comprising wetting a quantity of abrasive grain with a wettant resin-hardener that comprises an agent selected from the group consisting of the mono-, di-, and tri-, glycol di-monochloracetates and tri-methylene glycol di-monochloracetate and a mixture of two or more thereof, stirring into the wet abrasive grain a quantity of amine formaldehyde resin to produce a plastic moldable granular mix, compacting and shaping the mix at substantially room temperature, and then curing the mix at resin-curing temperature.

4. A grinding wheel or other abrasive body comprising abrasive grains bonded with a resin bond that comprises the reaction product of resin and a plasticizer and hardening agent selected from the group consisting of the mono-, di-, and tri-, glycol di-monochloracetates and tri-methylene glycol di-monochloracetate, or a mixture of two or more thereof.

5. The method of making a grinding wheel or other abrasive body comprising making a mix comprising abrasive grain and resin and a grain-wetting and resin-hardening agent selected according to the hardness desired for the abrasive wheel or other abrasive body, from the group consisting of, in the order of decreasing hardness, the mono-, di-, and tri-, ethylene glycol di-monochloracetates and tri-methylene glycol di-monochloracetate, and shaping and curing the mix.

6. The method of making a grinding wheel or other abrasive body comprising making a mix comprising abrasive grain and resin and a grain-wetting and resin-hardening agent that comprises a mixture of two or more compounds selected from the group consisting of the mono-, di-, and tri-, ethylene glycol di-monochloracetates and tri-methylene glycol di-monochloracetate.

7. Method of making abrasive articles comprising wetting a quantity of abrasive grain with a wettant plasticizer selected from the group consisting of the mono-, di-, and tri-, glycol di-monochloracetates and tri-methylene glycol di-monochloracetate, or a mixture of two or more thereof, stirring into the wet abrasive grain a quantity of aniline formaldehyde resin to produce a plastic moldable granular mix, working the mix into substantially sheet form of the desired thickness, cutting out of the sheet form the desired configuration of abrasive article, and then curing at resin-curing temperature.

8. Method of making abrasive articles comprising wetting a quantity of abrasive grain with a wettant plasticizer selected from the group consisting of the mono-, di-, and tri-, glycol di-monochloracetates and tri-methylene glycol di-monochloracetate, or a mixture of two or more thereof, stirring into the wet abrasive grain a quantity of aniline formaldehyde resin to produce a plastic moldable granular mix, molding the mix to the desired configuration of abrasive article, and then heat-treating at resin-curing temperature.

9. The method of making a grinding wheel or other abrasive body comprising making a mix comprising abrasive grain and resin and a grain-wetting and resin-hardening agent that comprises a compound selected from the group consisting of the mono-, di-, and tri-, glycol di-monochloracetates and tri-methylene glycol di-monochloracetate, or a mixture of two or more thereof, and shaping and curing the mix.

LORING COES, JR.